Figure 5C:
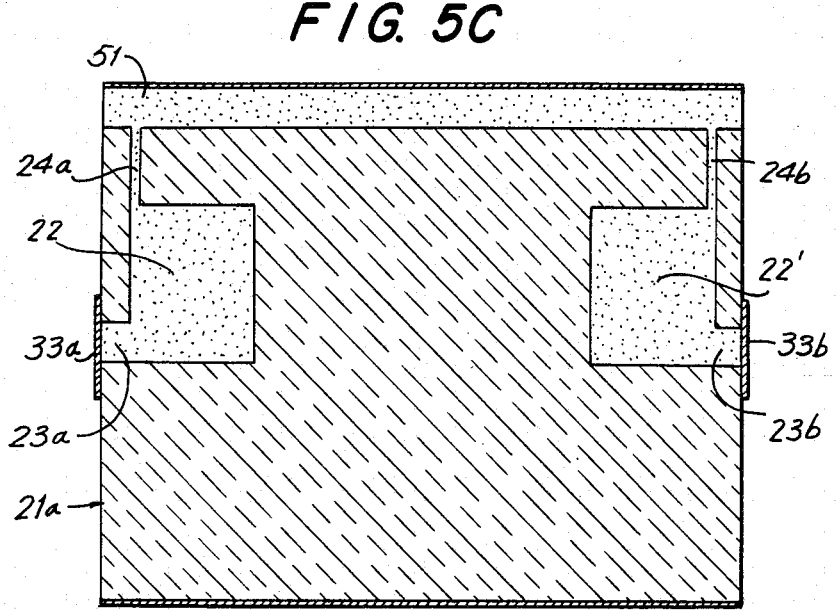

United States Patent [19]

Chan et al.

[11] Patent Number: 4,720,767
[45] Date of Patent: Jan. 19, 1988

[54] INTERNALLY FUSED VARIABLE VALUE CERAMIC CAPACITOR AND CIRCUIT

[75] Inventors: Ning-Huat Chan; Bharat Rawal, both of Myrtle Beach, S.C.

[73] Assignee: AVX Corporation, Great Neck, N.Y.

[21] Appl. No.: 909,680

[22] Filed: Sep. 22, 1986

[51] Int. Cl.[4] .......................... H01G 1/11; H01G 4/10
[52] U.S. Cl. ..................................... 361/275; 361/321
[58] Field of Search ........ 361/273, 275, 277, 303–305, 361/308–310, 321, 328, 329

[56] References Cited

U.S. PATENT DOCUMENTS

| | | | |
|---|---|---|---|
| 3,118,095 | 1/1964 | Baron et al. | 361/308 |
| 3,898,541 | 8/1975 | Weller | 361/321 |
| 4,193,106 | 3/1980 | Coleman | 361/275 |
| 4,433,359 | 2/1984 | Hamabe et al. | 361/273 |
| 4,466,045 | 8/1984 | Coleman | 361/277 |

FOREIGN PATENT DOCUMENTS 705353 3/1954 United Kingdom ................ 361/273

OTHER PUBLICATIONS

IBM Technical Disclosure Bulletin, vol. 27, No. 4A, Sep. 1984, pp. 1884–1885.

Primary Examiner—Donald A. Griffin
Attorney, Agent, or Firm—Arthur B. Colvin

[57] ABSTRACT

An internally fused variable value ceramic capacitor is disclosed. The fuse component is formed by a reduced cross section area of electroding material formed as a portion of a pattern on a ceramic layer of the capacitor. The capacitor incorporates three terminals, namely a common terminal, a terminal connecting the electrode layers intervening between the electrodes connected to the common terminal, and a third terminal coupled by the reduced cross section fuse area to the second mentioned terminal. The intermediate electrodes may be divided into discrete areas, and less than all of the intermediate electrodes may be interconnected to thereby permit variation in the capacitance of the device. Further described is a circuit whereby the capacitor is connected to the power supply terminals of an integrated circuit device or the like.

3 Claims, 10 Drawing Figures

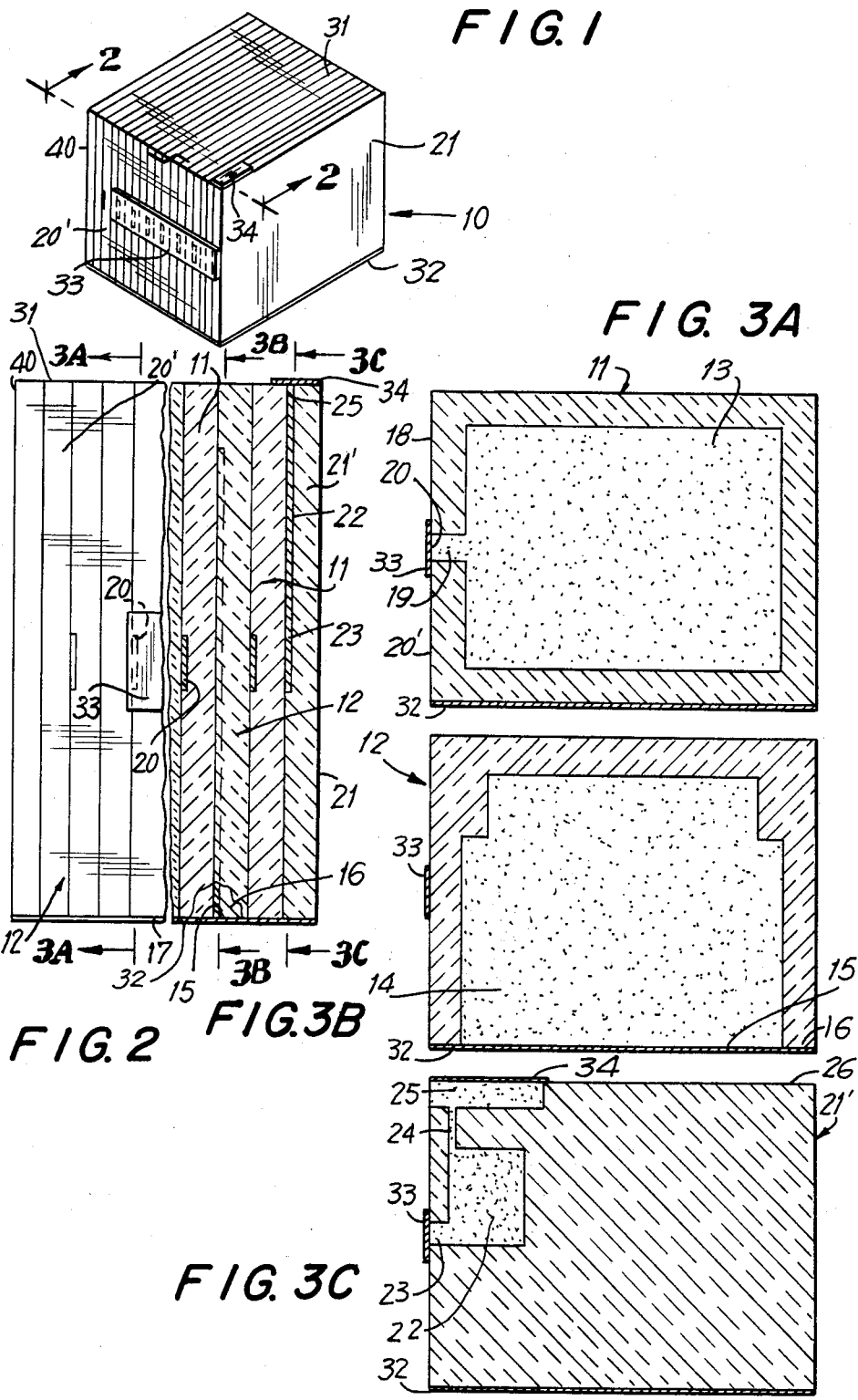

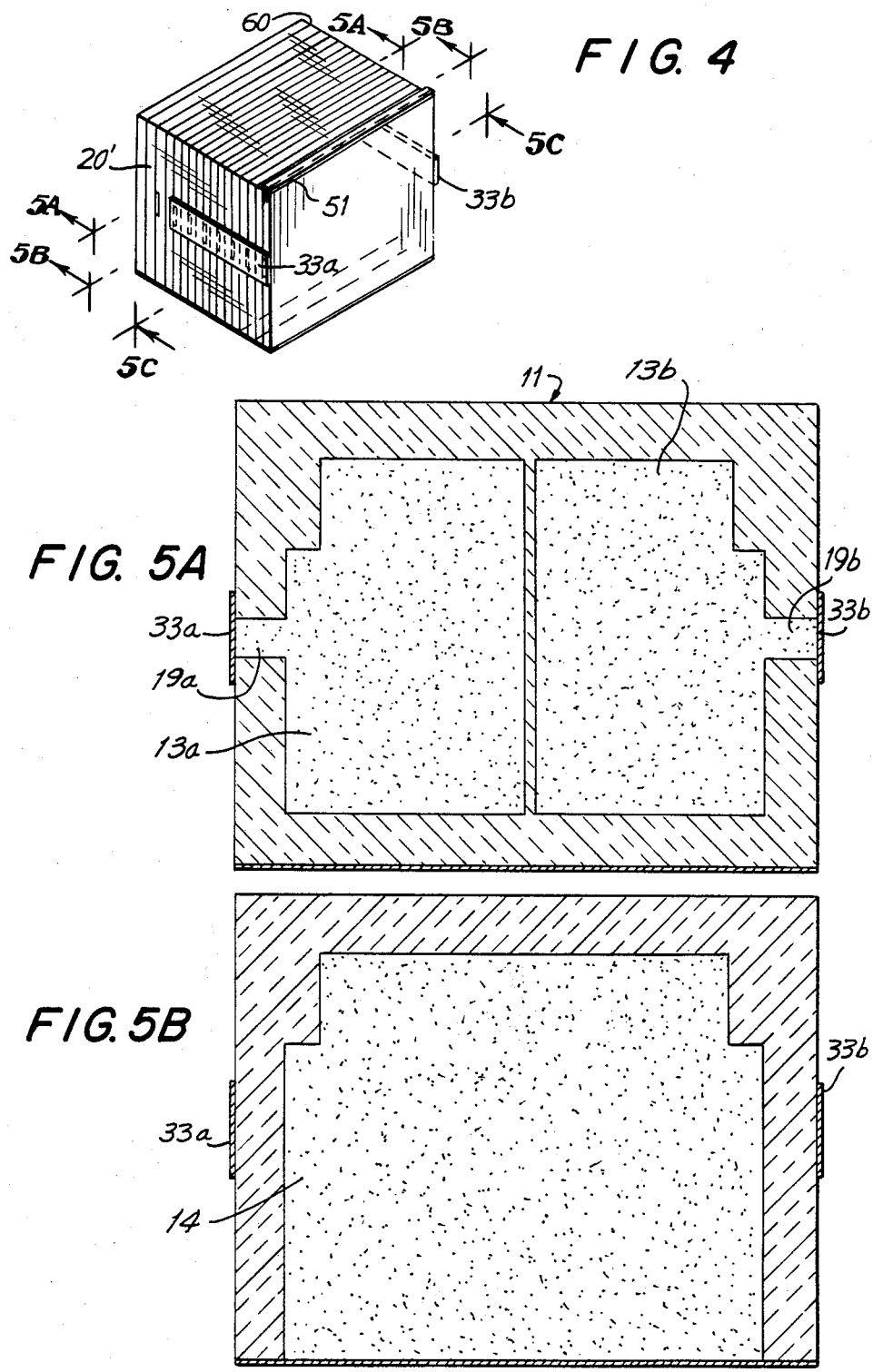

INTERNALLY FUSED VARIABLE VALUE CERAMIC CAPACITOR AND CIRCUIT

BACKGROUND OF THE INVENTION

1. Field of the Invention

The present invention is directed to improvements in capacitors of the multi-layer ceramic type (MLC). It is conventional in electronic devices such as computers, television sets, and the like to employ a multiplicity of MLCs especially in the power supply circuits associated with intergrated circuit devices. While MLCs have a number of other uses, a high percentage are employed as damping devices to dampen pulses generated in the power supply circuitry associated with I.C. devices, memory chips and the like.

MLCs typically comprise a multiplicity of thin layers of ceramic dielectric material with interposed layers of electrode material. In power supply cicuitry electrodes of opposite polarity are connected across the input power supply terminals of the devices to perform the pulse dampening effects noted.

Despite the advances in automated MLC manufacturing techniques, there still exists the possibility of a short circuit developing between electrodes of opposite polarity. Such short circuit may result from the deformation of the ceramic material under heating conditions with resultant distortion and contact between adjacent electrode layers. Additionally, mishandling of the capacitor in the course of processing is a further possible cause of such short circuiting.

In the event of capacitor failure due to short circuiting, there may result a large and uncontrolled electrical flow which causes damage to associated components in the electronic device such that the damage done to the device is difficult to diagnose and costly to repair.

Additionally, as will be readily recognized to those skilled in the art, the capacitance of a given MLC should be selected in accordance with the circuit requirements. In view of the wide variety of circuit parameters, manufacturers of MLCs are compelled to provide a wide range of capacitor values, such procedures involving variations from value to value in terms of the number of layers embodied in the capacitor, the size and configuration of the electrode areas, and the size and configuration of the monolithic ceramic device proper. Since in large measure, the application of multi-layer capacitors to printed circuit boards is an automated procedure, and since the apparatus employed for positioning the capacitors must be adjusted in most instances where the size of the multi-layer capacity varies, it is highly desirable to provide a constant sized capacitor body the capacitive value of which can be varied to assume a desired figure. It would be further appreciated to be desirable, to provide a capacitor which, in the event of failure, will fail in an "open" condition rather than a shorted condition.

It would be further appreciated by those skilled in the art, to be desirable to provide a capacitor which, in the event of a shorting between adjacent layers will still function to provide a capacitive value in the circuit, rather than merely forming an open circuit or a short between adjacent electrode layers.

2. The Prior Art

Various means have been suggested to eliminate or minimize the damages which may flow as a result of the shorting between capacitor layers of opposite polarity. By way of example, it has been proposed to provide a fuse combined with a monolithic ceramic capacitor (U.S. Pat. Nos. 4,107,759 and 4,193,106). Other examples of fuses embodied in or combined with capacitors of various sorts may be found in the following U.S. Pat. Nos.: 2,216,558; 3,579,062; 2,216,559; 3,368,083; 2,704,341; 4,107,762; 3,236,976; 4,150,419; 3,249,835; 4,186,417; 3,579,061; 4,442,473.

As an alternative to the approach of the above reference patents, it has been suggested to embody a fuse in the printed circuit devices to which the capacitor is connected. Representative examples of prior art patents adopting such approach are U.S. Pat. Nos.: 3,500,276; 4,072,976; 3,699,395; 4,342,977; 4,042,950; 4,394,639.

The fusing devices as represented by the above noted patents have not achieved significant commercial acceptability due principally to the complex manufacturing procedures required for the fabrication of the fused devices.

SUMMARY OF THE INVENTION

The present invention may be summarized as directed to a novel monolithic ceramic capacitor characterized in that the capacitor embodies an internal fuse which is created as an integral step in the manufacturing procedure requiring only minimal changes from conventional production techniques. The invention may be further summarized as directed to a monolithic ceramic capacitor, which in the event of an internal short circuit, will fail either in the "open" position or will function to exclude from the circuit the defective electrode groups, while retaining in the circuit others of the electrode groups, whereby a residual capacitance is maintained.

The invention may be further summarized as directed to a monolithic ceramic capacitor having fail safe features and also including means whereby the capacitive value of the monolith may be precisely selected within a relatively wide range.

The invention may be further summarized as directed to a power supply damping circuit including a capacitor, having fail safe characteristics including an internal fuse, the circuit minimizing the resistance increasing effects of the internal fuse.

Still more particularly, the present invention may be summarized as directed to a monolithic ceramic capacitor having first and second groups of electrodes, the electrodes of the first group including portions extending, as is conventional, to a first face of the monolith. The electrodes of the second group include tabs or extensions extending to a second face of the monolith. The capacitor includes a ceramic layer provided with conductive material which preferably may comprise the same materials as used in the formation of the electrodes and includes a first tab registering with the tabs of the electrodes of the second group extending to the second face of the monolith and a second tab extending to a third face of the monolith, a reduced cross section area being interposed between the noted pairs of tabs.

The electrodes of the first group are terminated in conventional fashion. A selected number of tabs of the electrodes of the second group are connected to the first tab on the second face of the monolith, the number of tabs which are connected to said tab controlling the capacitance of the device. A further termination is effected to the tab extending to the third face of the monolith whereby it will be understood that the termination on the said third face is connected electrically to the electrodes of the second group through the medium of the reduced cross section portion which functions in the manner of a fuse. The capacitor may include three terminations notably of a termination to the first group of electrodes on the first face of the monolith, a termination to the extending tabs of the electrodes of the second group on the second face, and a termination connected to the tab or the third face of the monolith which is connected to the electrodes of the second group through the fuse component. In this manner it is possible selectively to employ the capacitor either in a conventional fashion, or as an internally fused device.

In accordance with an alternate and preferred arrangement, the electrodes of the second group may be split into two discrete electrode surfaces and the electrode tabs of the discrete electrode components may extend to opposite faces of the monolith. In accordance with the last mentioned arrangement, a ceramic layer may employ a pair of tabs registering with the respective tabs of the electrodes of the second group, and a first and second fuse element may be interposed between a termination connected to the fusing element and each of the respective sets of tabs of the electrodes of the second group. In accordance with this arrangement, it is possible for one of the fuse elements to be opened with the device still retaining the capacitance effect provided by the electrodes of the first group and those portions of the electrodes of the second group which remain connected to the termination of the fusing element still operative. In the embodiment of the last mentioned type, it will be appreciated that the capacitance may be varied within a particularly wide range, and may be especially accurately determined in accordance with the number of half layers of electrodes of the second group which are actively connected in the circuit.

The invention is further directed to a circuit arrangement whereby a capacitor as above described is employed as the damping capacitor for the power supply input terminals of an intergrated circuit device, I.C. device, or memory chip. The capacitor is highly advantageous in such circuit in that the input current to the I.C. device may be routed through the fused terminal of the capacitor, or may be connected directly to the termination of the capacitor not incorporating the fuse thereby increasing the efficiency of the capacitor by avoiding the internal resistance embodied in the fuse.

It is accordingly an object of the invention to provide an internally fused variable value ceramic capacitor and circuit embodying the same. A further object of the invention is the provision of a capacitor of the type described which may be manufactured by conventional ceramic capacitor manufacturing procedures. Still a further object of the invention is the provision of a capacitor of the type described which upon failing will provide an open rather than a short circuit condition. Still a further object of the invention is the provision of a capacitor of the type described wherein a percentage of the capacitance may be preserved notwithstanding partial failure through short circuiting of components of the capacitor. Still a futher object of the invention is the provision of a circuit including a power supply and I.C. device and a capacitor in shunting relation of the power supply terminals of the I.C. device, characterized in that the fuse component of the capacitor is interposed in the circuit solely in the charging condition thereof, the I.C. power supply being discharged directly through the electrodes of the capacitor without any interposed resistance from the fuse components in the capacitor.

Figure 6:
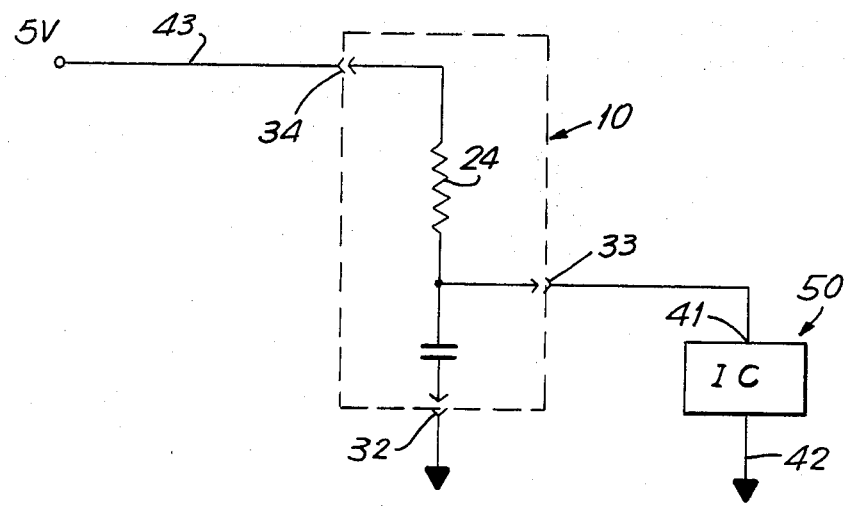

In order to attain these objects and such other objects as may appear herein or be hereinafter pointed out, references made to the accompanying drawings in which:

FIG. 1 is a diagramatic perspective view of a capacitor in accordance with an embodiment of the invention, FIG. 2 is a sectional view taken along line 2—2 of FIG. 1, FIG. 3A is a sectional view taken along line 3A—3A of FIG. 2, FIG. 3B is a sectional view taken along line 3B—3B of FIG. 2, FIG. 3C is a sectional view taken along line 3C—3C of FIG. 2, FIG. 4 is a view similar to FIG. 1 of a capacitor in accordance with another embodiment of the invention, FIG. 5A is a sectional view taken along line 5A—5A of FIG. 4, FIG. 5B is a sectional view taken along line 5B—5B of FIG. 4, FIG. 5C is a sectional view taken along line 5C—5C of FIG. 4, and FIG. 6 is a circuit diagram illustrating the use of a capacitor in accordance with the invention as the shunting capacitor in the power supply circuit of an I.C. device or the like.

Referring now to the drawings there is shown diagramatically in FIG. 1 a monolithic ceramic capacitor 10 which is comprised of a multiplicity of alternately applied active layers 11 and 12 carrying electrode areas 13 and 14 respectively of opposite polarity. The respective layers 11 and 12 are comprised of ceramic dielectric material such as barium titenate or any other suitable material having a high dielectric constant. The electrode components 13 and 14 are comprised of metal, which, as is conventional, is applied by screening an ink containing the metal in particulate form onto the ceramic layers.

The method of manufacturing the capacitor is in all respects conventional and forms no part of the present invention. In general, the method includes extruding a thin layer of "green" ceramic particles held in suspension within a polymeric binder onto a flat surface, driving off solvents so as to provide a thin flexible sheet, imprinting the sheet or sheets with a multiplicity of electrode designs through the utilization of an electroding ink including a heat resistant noble metal such as paladium, superposing a multiplicity of imprinted sheets one atop the other in pre-determined orientation, and thereafter dicing the sheets along predetermined severence lines to form a so-called green capacitor.

The green capacitors are heated to drive off the organic components, and thereafter sintered to form monolithic ceramic capacitors.

In accordance with the present invention, the electrode component 14 of layers 12 comprising the first group of electrodes includes an edge portion 15 which extends to and is exposed at the lower edge 16 of the layers 12 (FIGS. 2 and 3B). Edge 16 coincides with the first or bottom face 17 (FIG. 1) of the monolith 10. It will be noted that all other margins of the electrode portion 14 are spaced from the edges of the ceramic layers 12. The electrode area 13 of layers 11 is spaced from all of the edges of the ceramic layer except for the edge 18, the electrode layer 13 including a laterally directed tab 19 exposed as at 20 on edge 18 which extends to the second face 20' of the monolith. It will be understood that layers 11 and 12 electroded as shown in FIGS. 3A and 3B are alternately stacked to define the monolith 10, it being conventional to include up to 50 or more of such layers in the monolith.

In accordance with the invention, face 21 of the monolith is defined by a ceramic layer 21', the inner surface of which has been provided with a conductive area patterned as at 22. The area 22 includes a side tab 23 positioned on layer 21' so as to register with the tabs 19 of layers 11 in the stacked condition of the layers. The pattern 22 includes a reduced cross section area 24 which functions in the manner of a fuse, the reduced cross section area 24 providing electrical connection to end tab 25 exposed on edge portion 26 of the layer 21'.

The position in the monolith 10 of the various layers 11, 12 and 21' will be readily appreciated from an inspection of FIGS. 1 and 2. As will be clear from such figure, the edge portions 15 of electrodes 14 are exposed on the first or bottom face 17 of the monolith whereas the ends 20 of tab portions 19 of electrodes 13 and the end of the tab 23 of layer 21' are all exposed in registry on the second or front face 20' of the monolith. In similar fashion, the termination tab 25 of layer 21' is exposed at a third or top face 31 of the monolith.

Terminations to the monolith of FIG. 1 are effected as follows. A first termination 32 is formed on bottom face 17 of the monolith, the termination 32 being in electrical contact with the edge portions 15 of electrodes 14. A second termination 33 is formed on front face 20' of the monolith in registry with side tabs 19 of electrode layers 13 and with the tabs 23 of layer 21'. The termination 33 may selectively be applied throughout the entire dimension of the face 20' of the monolith, in which event each of the electrode layers 13 will be incorporated as an element of the capacitor. Alternatively, by appropriate masking techniques, the termination 33 may be applied as shown in FIG. 1 beginning with the tab 23 but extending less than the entire dimension of the face 20' whereupon less than all of the electrodes 13 will be included as active electrodes of the capacitor. In this latter event, it will be observed that the value of the capacitor will be lower than would be the case if all of the electrodes 13 were connected to termination 33.

Optionally, but preferably, the termination material 33, which in practice is an extremely thin layer but is illustrated as having substantial thickness for purposes of clarity, is applied by a sputtering technique. By appropriately masking face 20' of the monolith, the number of layers contacted by the termination, and consequently, the value of the capacitor can be controlled within close tolerances.

A further termination 34 is applied on the third or top face 31 in contact with the termination tab 25 of layer 21'. It will be appreciated, that in accordance with conventional practice, a ceramic layer 40 may be disposed against the side layer 12 to define a protective environment therefor. The terminations 32, 33 and 34 may, as is conventional, be connected to output leads following which the capacitor may be incapsulated in a hermetic sealing polymeric composition.

As will be apparent from an inspection of FIG. 1, it is possible to utilize the noted capacitor either as a fused capacitor by connecting the capacitor into a circuit utilizing terminations 32 and 34 whereupon the reduced cross section area 24 is in series with the circuit of the capacitor or as a conventional capacitor by utilizing terminations 32 and 33.

A still further circuit adaptation is disclosed in FIG. 6 wherein the capacitor 10 is schematically illustrated. In accordance with the circuit of FIG. 6, an I.C. chip 50 is used in conjunction with capacitor 10, the capacitor serving as a means of dampening voltage spikes in the power supply of the I.C. More particularly terminal 41 of the I.C. represents the positive power supply input terminal and terminal 42 the ground terminal of the I.C. chip 50. In this circuit the power supply voltage is applied through conductor 43 to the termination 34 of the capacitor. The positive input terminal 41 to the I.C. chip is connected to termination 33 of the capacitor whereupon it will be seen that voltage from the power supply passes through the reduced cross section or fuse member 24 outwardly through termination 33, to the input terminal 41 of the I.C. device. Termination 32 of the capacitor and 42 of the I.C. device are connected to ground. The described circuit has the particular advantage that the internal capacitors of the I.C. device are able to obtain high current charge from the external capacitor 10 without the intervening resistance of the reduced cross section area 24. However, the reduced cross section area 24 is interposed in the circuit between the source of power supply voltage through line 43 and the I.C. chip so as to protect the I.C. chip and associated components, in the event of a shorting of the capacitor or elements of the circuitry downstream of the capacitor, i.e., in the I.C. device proper.

There is shown in FIGS. 4, 5A, 5B, and 5C a further embodiment of capacitor in accordance with the invention. In the embodiment of FIGS. 4, 5A, 5B, and 5C wherein like parts have been given like reference numerals, the electrodes of layers 11 have been divided into two discrete electrode areas namely 13a and 13b. Electrode area 13a extends to the second face 20' of the capacitor via side tab 19a. Electrode area 13b extends to the fourth face of the capacitor 60 via side termination tab 19b. The ceramic outer layer 21a is shown in FIG. 5C and includes side termination tabs 23a and 23b which in stacked condition of the monolith, register respectively with side tabs 19a and 19b. The layer 21a includes an end termination bar 51 which preferably extends the entire width of the layer 21a. A first fuse or reduced cross section area 24a is connected between side tab 23a and bar 51. A second fuse or reduced cross area 24b is connected between side tab 23b and bar 51.

As will be apparent from an inspection of FIGS. 4 and 5C, side termination 33a connects side tabs 19a to tab 23a and thence via reduced cross section 24a to the end termination bar 51. In similar fashion, the side termination 33b connects tabs 23b via reduced cross section area 24b to the termiation bar 51.

The apparatus of FIG. 4 provides significant advantages. By providing two paths 24a and 24b of reduced cross sectional size, the internal resistance to electrodes 13a and 13b is reduced. Also, since the extent or length of side terminations 33a and 33b may be independently controlled, an especially high degree of control of the capacitance of the device is possible. Finally, in the event of a shorting between electrode layer 14 and either of electrode layers 13a or 13b, it will be apparent that the high current flow will be restricted to one or the other of the reduced cross section areas 24a or 24b with the result of an opening of the fuse defined by such reduced cross section areas 24a and 24b. As will be apparent, the opening of one or the other of such areas will none the less result in a continued capacitance provided by the one of the reduced cross section areas 24a or 24b, which remain intact, whereupon the circuit in which the capacitor is inserted will retain a fraction of the initial capacitance.

It will be readily recognized by those skilled in the art that the concept of subdividing electrodes into two discrete areas can be extended to encompass three or more discrete electrodes in the alternate layers.

Without limitation and in order to comply with the requirements of the patent laws, a preferred example of the electrode material is a material formed from a screened ink including a paladim base. The paladium may be mixed with solvents and organic filler materials.

As will be appreciated by those skilled in the art, the configuration and dimensions of the reduced cross section areas 19 may be varied in accordance with the desired operating parameters of a given capacitor so as to permit the passage of more or less current before rupture of the reduced cross section area as required.

As will be apparent to those skilled in the art, numerous variations in details of construction may be made in the instant device without departing from the spirit of the present invention. Accordingly, the invention is to be broadly construed within the scope of the appended claims.

What is claimed as new and sought to be protected by Letters Patent of the United States is as follows:

1. An electronic device comprising an intergrated circuit device having power supply input terminals, a multi-layer ceramic capacitor having a plurality of electrode layers and having a first terminal connected to alternate electrode layers of said capacitor, a second terminal connected to the electrode layers of said capacitor intermediate said alternate electrode layers and a third terminal, a fuse member formed internally of said capacitor and electrically interposed between said third terminal and said intermediate electrode layers, first connector means interposed between a power supply terminal of said intergrated circuit device and said first terminal of said capacitor, second connector means interposed between the other power supply terminal of said intergrated circuit device and said second terminal of said capacitor and power supply means having leads of opposite polarity connected respectively to said first and third terminals of said capacitor, whereby charging currents to said I.C. device from said power supply means, flow through said fuse, and said capacitor is connected directly across said power supply input terminals of said intergrated circuit device with no series connection to said fuse.

2. An internally fused ceramic capacitor having a plurality of opposed surfaces and comprising a plurality of layers of ceramic dielectric material, a first electrode member covering a major portion of each of the surfaces of alternate ones of said layers, each said electrode member having an edge portion extending to a first face of said capacitor, a second electrode member covering a major portion of each of the surfaces of said layers interposed between said alternate layers, said second electrode members being divided into two discrete areas, one said area including a portion extending to a second face of said capacitor and the other said area including a portion extending to a third face of said capacitor, an additional layer of ceramic dielectric material having a conductive pattern formed on a surface thereof, said pattern including a first tab extending to said second face of said capacitor in registry with said portions of said one area of said second electrodes and a second tab extending to said third face in registry with said portions of said other area of said second electrodes, other portions of said pattern extending to a fourth face of said capacitor, first and second reduced cross section areas defining fuses formed on said additional layer, said reduced cross section areas being interposed between said other portions of said pattern and said first and second tabs respectively, a first termination on said first face of said capacitor in electrical connection with said edge portions of said first electrode members, a second termination on said second face of said capacitor electrically connecting at least some of said portions of said second electrode members on said second face and said first tab, a third termination on said third face of said capacitor electrically connecting at least some of said portions of said second electrode on said third face and said second tab, and a fourth termination on said fourth face of said capacitor connected to said other portions of said pattern.

3. A capacitor in accordance with claim 2 wherein said portions of said pattern on said fourth face extend substantially the entirety of the width of said fourth face of said capacitor.

* * * * *